United States Patent
Zhang et al.

(10) Patent No.: US 9,584,279 B2
(45) Date of Patent: Feb. 28, 2017

(54) PILOT SIGNAL CONFIGURATION METHOD, ASSOCIATED WIRELESS NETWORK NODE, PILOT-SIGNAL-BASED RECEPTION METHOD AND ASSOCIATED USER EQUIPMENT

(71) Applicant: Telefonaktiebolaget LM Ericsson (publ), Stockholm (SE)

(72) Inventors: Zhang Zhang, Beijing (CN); Xinyu Gu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/442,249

(22) PCT Filed: Oct. 18, 2013

(86) PCT No.: PCT/CN2013/085438
§ 371 (c)(1),
(2) Date: May 12, 2015

(87) PCT Pub. No.: WO2014/075531
PCT Pub. Date: May 22, 2014

(65) Prior Publication Data
US 2016/0197711 A1    Jul. 7, 2016

Related U.S. Application Data

(63) Continuation of application No. PCT/CN2012/084573, filed on Nov. 14, 2012.

(51) Int. Cl.
*H04W 24/00* (2009.01)
*H04W 36/18* (2009.01)
(Continued)

(52) U.S. Cl.
CPC ........... *H04L 5/0051* (2013.01); *H04W 48/12* (2013.01); *H04W 64/00* (2013.01)

(58) Field of Classification Search
CPC ............... H04W 80/04; H04W 72/042; H04W 72/0453; H04W 16/28; H04W 24/00; H04W 28/04; H04W 72/04; H04W 36/18
See application file for complete search history.

(56) References Cited

U.S. PATENT DOCUMENTS

| 6,330,460 B1 | 12/2001 | Wong et al. | |
| 2011/0237270 A1* | 9/2011 | Noh ................. | H04W 72/0453 455/450 |

(Continued)

FOREIGN PATENT DOCUMENTS

| CN | 101939957 | 1/2011 |
| WO | WO 2010/099657 | 9/2010 |
| WO | 2012039652 A1 | 3/2012 |

OTHER PUBLICATIONS

PCT Notification of the International Search Report and the Written Opinion of the International Searching Authority, or the Declaration for International application No. PCT/CN2013/085438, Jan. 23, 2014.

(Continued)

*Primary Examiner* — Andrew Lee
(74) *Attorney, Agent, or Firm* — Patent Portfolio Builders, PLLC

(57) ABSTRACT

The present disclosure discloses a pilot signal configuration method in a wireless communication system and an associated wireless network node. The method comprises allocating a dedicated pilot signal to a User Equipment (UE) within a combined cell. The method further comprises selecting, from all Transmit-Receive Points (TRPs) within the combined cell, at least one TRP in the proximity of the UE for transmission of the dedicated pilot signal to the UE. The (Continued)

present disclosure further provides a pilot-signal-based reception method in a wireless communication network and an associated UE.

18 Claims, 6 Drawing Sheets

(51) Int. Cl.
*H04L 5/00* (2006.01)
*H04W 48/12* (2009.01)
*H04W 64/00* (2009.01)

(56) References Cited

U.S. PATENT DOCUMENTS

| | | |
|---|---|---|
| 2011/0255584 A1 | 10/2011 | Dateki |
| 2012/0188888 A1* | 7/2012 | Wang ..................... H04B 7/024 370/252 |
| 2012/0281554 A1 | 11/2012 | Gao et al. |
| 2012/0281646 A1* | 11/2012 | Liao .................... H04W 72/042 370/329 |
| 2012/0327873 A1* | 12/2012 | Kim .................. H04W 72/1289 370/329 |
| 2013/0114656 A1* | 5/2013 | Sayana .................. H04B 7/024 375/219 |
| 2013/0155968 A1* | 6/2013 | Pelletier .............. H04W 72/042 370/329 |
| 2014/0079009 A1* | 3/2014 | Liu ........................ H04W 8/26 370/329 |
| 2014/0177745 A1* | 6/2014 | Krishnamurthy .... H04B 7/0413 375/267 |
| 2015/0055612 A1* | 2/2015 | Tanaka .................. H04W 16/28 370/329 |
| 2015/0281973 A1* | 10/2015 | Svedman ............ H04W 72/042 455/454 |

OTHER PUBLICATIONS

3GPP TSG RAN WG1 Meeting #71; New Orleans, USA; Title: Combined Cell Deployment Scenarios in Heterogeneous Networks (R1-125220), Nov. 12-16, 2012.

TSG RAN Meeting #57; Chicago, USA; Title: Proposed SID: Study on UMTS Heterogeneous Networks (RP-121436) Sep. 4-7, 2012.

* cited by examiner

PILOT SIGNAL CONFIGURATION METHOD, ASSOCIATED WIRELESS NETWORK NODE, PILOT-SIGNAL-BASED RECEPTION METHOD AND ASSOCIATED USER EQUIPMENT

PRIORITY

This nonprovisional application is a U.S. National Stage Filing under 35 U.S.C. §371 of International Patent Application Serial No. PCT/CN2013/085438, filed Oct. 18, 2013, and entitled "Pilot Signal Configuration Method, Associated Wireless Network Node, Pilot-Signal-Based Reception Method and Associated User Equipment" which claims priority to International Patent Application Serial No. PCT/CN2012/084573 filed Nov. 14, 2012, both of which are hereby incorporated by reference in their entirety.

TECHNICAL FIELD

The present disclosure generally relates to configuration and use of pilot signal, and particularly, to pilot signal configuration method, an associated wireless network node, a pilot-signal-based reception method, and an associated user equipment (UE).

BACKGROUND

The number of smart phones, wireless-enabled tablets and laptop computers in the Universal Mobile Telecommunications System (UMTS) networks is growing rapidly. It is important for network operators to evolve their networks in terms of capacity and coverage so that positive user experience can be sustained.

Deployment of low-power nodes (LPNs) is seen as a powerful tool to achieve the goal. A network consisting of traditional macro NodeBs and LPNs is referred to as a heterogeneous network. Two use-cases for heterogeneous network deployment that may be envisioned are coverage holes ad localized traffic hotspots. Deployment of LPNs as a complement to a macro network then aims at improving coverage and capacity, respectively.

In the heterogeneous network deployment, an LPN can either form a separate cell (such as, a pico cell or a micro cell) by itself or be one of the spatially separated Transmit-Receive Points (TRPs) in one logical cell. The former case is referred to as separated-cell scenario, while the latter case is referred to as combined-cell (or shared-cell) scenario.

As compared with the separated-cell scenario, signalling reception and interference handling for the combined-cell scenario are much easier. Moreover, for the combined-cell scenario, no handover is needed between the different TRPs in the same combined cell, ensuring a more smooth mobility procedure and easing the Radio Network Controller (RNC) load.

However, according to the prior-art transmission scheme for the combined-cell scenario, all TRPs within a combined-cell transmit the same physical channel. This adversely limits the system capacity of the combined cell.

At Technical Specification Group-Radio Access Network (TSG-RAN) meeting #56, a study item (SI) was initiated on Universal Mobile Telecommunications System (UMTS) Heterogeneous Networks for $3^{rd}$ Partnership Project (3GPP) Rel-12 [1]. There exist more opportunities for 3GPP Rel-12 to include value-added features to further improving the performance of Heterogeneous Networks.

SUMMARY

An object of the present embodiments is to facilitate simultaneous transmissions to more than one UEs from selected TRPs in the proximity of the UEs within the same combined cell by providing a novel pilot signal configuration method, an associated wireless network node, a pilot-signal-based reception method and an associated UE.

To achieve the object, according to a first aspect of the embodiments, there is provided a pilot signal configuration method performed by a wireless network node in wireless communication system. The method comprises allocating a dedicated pilot signal to a UE within a combined cell. The method also comprises selecting, from all TRPs within the combined cell, at least one TRP in the proximity of the UE for transmission of the dedicated pilot signal to the UE.

According to a second aspect of the embodiments, there is provided a wireless network node. The wireless network node comprises a pilot allocation unit configured to allocate a dedicated pilot signal to a UE within a combined cell. The wireless network node also comprises a TP selection unit configured to select, from all TRPs within the combined cell, at least one TRP in the proximity of the UE for transmission of the dedicated pilot signal to the UE.

According to a third aspect of the embodiments, there is provided a pilot-signal-based reception method performed by a UE in a wireless communication system. The method comprises receiving a dedicated pilot signal from at least one TRP in the proximity of a UE. The method also comprises performing channel estimation and/or demodulation based on the received dedicated pilot signal.

According to a fourth aspect of the embodiments, there is provided a UE. The UE comprises a pilot receiving unit, a channel estimation unit and a demodulation unit. The pilot receiving unit is configured to receive dedicated pilot signal from at least one TRP in the proximity of the UE. The channel estimation unit is configured to perform channel estimation based on the received dedicated pilot signal. The demodulation unit is configured to perform demodulation based on the received dedicated pilot signal.

According to a fifth aspect of the embodiments, there is provided a wireless network node. The wireless network node comprises a memory which has machine-readable program code stored therein and a processor which executes the stored program code to control the wireless network node to perform the method according to the first aspect of the embodiments.

According to a sixth aspect of the embodiments, there is provided a UE. The UE comprises a memory which has machine-readable program code stored therein and a processor which executes the stored program code to control the UE to perform the method according to the third aspect of the embodiments.

According to a seventh aspect of the embodiments, there is provided a computer readable medium storing therein a program for a wireless network node or a UE. The program causes the wireless network node or the UE to perform a method according to the first and third aspects of the embodiments, respectively.

As a dedicated pilot signal is transmitted from one or more selected TRPs in the proximity of a UE and received by that UE, the methods and devices according to the above aspects of the embodiments facilitate simultaneous transmissions to more than one UEs from selected TRPs in the proximity of the UEs within the same combined cell, which in turn allows for an increased system capacity of the combined cell.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF THE PREFERRED EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 1:
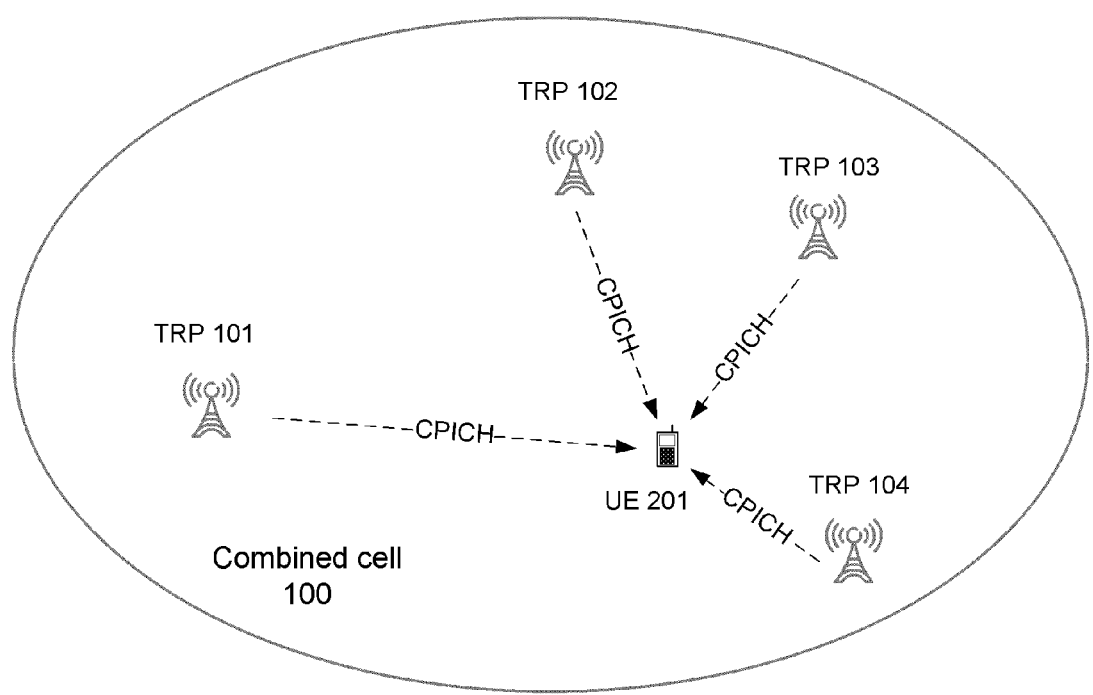
FIG. 1 is a diagram schematically illustrating a pilot transmission scheme according to the prior art.

FIG. 1 schematically illustrates a pilot transmission scheme according to the prior art. As illustrated in FIG. 1, four TRPs 101-104 are distributed in a combined cell 100. Although a UE 201 is geographically closest to the TRP 104, all TRPs 101-104 transmit the same Common Pilot Channel (CPICH) to the UE 201. In this case, the UE 201 cannot estimate the single channel from the TRP 104 to itself, and thus cannot perform data reception via this channel.

Figure 2:
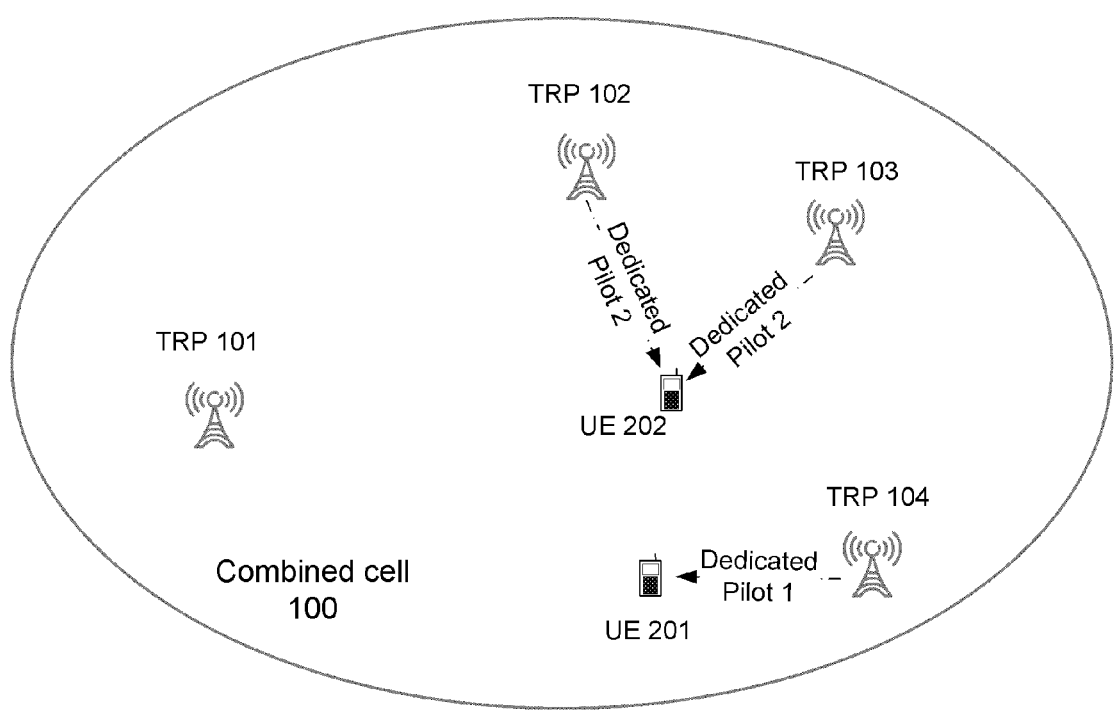
FIG. 2 is a diagram schematically illustrating a pilot transmission scheme according to the present disclosure.

For comparison, FIG. 2 schematically illustrates a pilot transmission scheme according to the present disclosure. Note that CPICH is still transmitted from all TRPs within the combined-cell 100, although it is not expressly shown for the sake of simplicity. As illustrated in FIG. 2, dedicated pilots are newly introduced in the combined cell 100. In contrast with the CPICH transmitted from all TRPs within the combined-cell, a dedicated pilot is transmitted from one or more selected TRPs in the proximity of the UE. As exemplified in FIG. 2, a dedicated pilot 1 is transmitted from TRP 104 to UE 201, and the same dedicated pilot 2 is transmitted from TRPs 102 and 103 to UE 202. In this case, based on the received dedicated pilot 1, the UE 201 can estimate the single channel from the TRP 104 to itself, so that the UE 201 can perform data transmission and reception with only one TRP (TRP 104, in this example) in its proximity within the combined cell 100. Likewise, based on the received dedicated pilot 2, the UE 202 can estimate the channels from the TRPs 102 and 103 to itself, so that the UE 202 can perform data transmission and reception with more than one TRP (TRPs 102 and 103, in this example) in its proximity within the combined cell 100. That is, a spatial reuse scheme (i.e., simultaneous transmissions to more than one UEs from selected TRPs in the proximity of the UEs) can be implemented for the UE 201 and the UE 202 within the combined cell 100, and a SFN or a (distributed) MIMO transmission scheme (i.e., transmission from more than one selected TRPs to a UE) can be implemented for the UE 202 within the combined cell 100.

Remarkably, the SFN transmission scheme facilitated by the dedicated pilot is superior to the conventional SFN transmission scheme facilitated by the CPICH in that it avoids transmissions from remote TRPs, which make negligible contribution to the useful signal but make considerable contribution to the interference.

As known to those skilled in the art, the expression "a TRP is in the proximity of a UE" means that the distance from the TRP to the UE is lower than a certain length. Therefore, a straightforward manner for determining whether a TRP is in the proximity of a UE is to acquire the position of the UE (for example, by requesting the UE's Global Positioning System (GPS) position from the UE), calculate the distance between the TRP and the UE based on the known position of the TRP and the acquired position of the UE, and compare the calculated distance with a prescribed length.

To determine their proximity to a UE for TRPs within a combined cell in the above manner, the same length or different lengths may be prescribed for the TRPs. In the former case, to ensure that at least one TRP may be selected to serve the UE, the length may be prescribed as the maximum of service area radii of all TRPs in the combined cell. In the latter case, various lengths may be prescribed by the network operator for different TRPs.

As an alternative to the straightforward manner described above, instantaneous or time-average strengths of uplink control signals received at the TRPs from the UE may be employed to determine which TRP(s) within the combined cell is (are) in the proximity of the UE. Specifically, in the beginning, the TRP receiving one of the uplink control signals with the highest signal strength is determined as the optimal TRP, which is of course considered to be in the proximity of the UE. Then, it is determined whether any other TRP receives a uplink control signal with a signal strength not lower than the highest signal strength by a threshold (which is typically between 3-5 dB in logarithmic scale). If so, the TRP is able to provide the UE with a significantly improved link quality when operating in combination with the optimal TRP, and therefore may also be determined to be in the proximity of the UE. Otherwise, only the optimal TRP is determined to be in the proximity of the UE.

Figure 3:
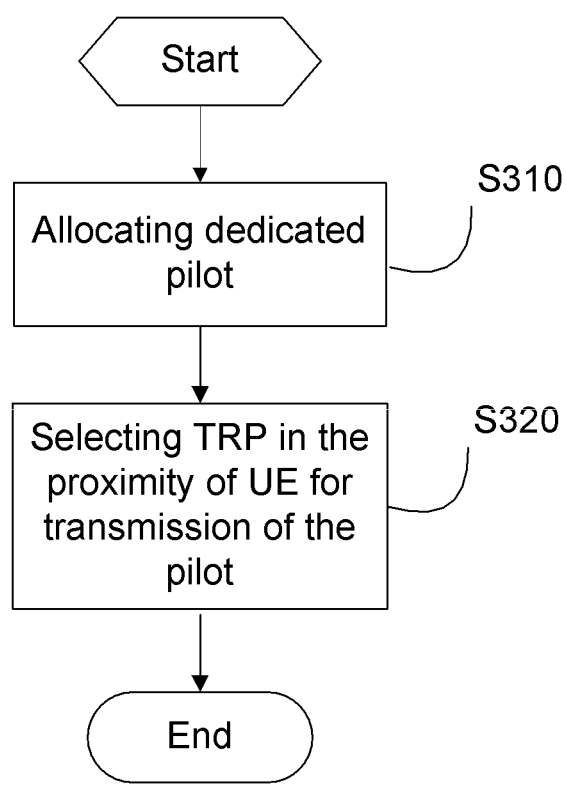
FIG. 3 is a flowchart schematically illustrating a pilot signal configuration method according to an embodiment of the present disclosure.

FIG. 3 is a flowchart schematically illustrating a pilot signal configuration method according to an embodiment of the present disclosure. As illustrated, after a start of the proposed method, a dedicated pilot signal is allocated to a UE within a combined cell (S310). The allocation of dedicated pilot signal can be implemented in a wireless network node, such as a RNC (Radio Network Controller), a BS (Base Station), and/or the like. The UE can be informed of the allocated pilot signal, for example, via RRC signalling. Then, at least one TRP in the proximity of the UE is selected from all TRPs within the combined cell, for transmission of the dedicated pilot signal to the UE (S320). The selection of TRP can be implemented in the same wireless network node. After that, the proposed method ends.

As a feasible manner to implement step S310, once the UE enters the combined cell, a dedicated pilot signal is allocated to the UE and exclusively used by the UE. This implies that the dedicated pilot signal is UE specific and will not change when the UE moves between TRPs within the combined cell.

Accordingly, there should be (channel code) resource dedicatedly reserved for that pilot signal. That is, when one channel code is used by a dedicated pilot, this code cannot be used for any other purpose within the same combined cell. To save channel code resource, it is preferable for each UE to transmit its dedicated pilot by using a specific scrambling code.

In this case, the Downlink (DL) transmission becomes very similar to the Uplink (UL) transmission in the following aspects:

The channel code for the dedicated pilot can be predefined, as in the case with Dedicated Physical Control Channel (DPCCH) in UL.

Signalling dedicated to the UE (e.g. High Speed-Shared Control Channel (HS-SCCH) order) can be transmitted on the UE-specific scrambling code.

The UE-specific scrambling code also does not change when the UE moves between TRPs within the same combined cell.

One major advantage with the UE-specific dedicated pilot scheme is that the transmission/mobility handling can be transparent to the UE within one combined cell (as in UL).

Another feasible manner to implement step S310 is to determine which UE group the UE belongs to and allocate a dedicated pilot signal shared by UEs in the UE group to the UE. In this regard, the dedicated pilot signal is group specific. To be specific, if a UE transfers from group A to group B, it cannot use the dedicated pilot signal specific to group A anymore; instead, the dedicated pilot signal specific to group B shall be used.

By way of example, a UE may be determined as belonging to a SFN group or a non-SFN group, according to whether the UE applies the SFN transmission scheme or not applies the SFN transmission scheme.

It should be understood by those skilled in the art that various other criteria could be applied to group UEs, without departing from claimed subject matter.

For example, UEs may be grouped according to one or more of their capability, speed or the like, in addition to or instead of whether the SFN transmission scheme is applied. Specifically, in addition to or instead of whether it applies the SFN transmission scheme or not, a UE may be grouped according to whether or not it is MIMO-capable and/or which speed range its moving speed falls into.

In this manner, UEs using the same transmission scheme and/or having the same capability and/or similar moving speeds may be grouped together.

An alternative manner to implement step S320 is to determine which area the UE is located in and allocate a dedicated pilot signal shared by UEs located in that area to the UE. In this regard, the dedicated pilot signal is area specific. To be specific, if a UE moves from area A to area B, it cannot use the dedicated pilot signal specific to area A anymore; instead, the dedicated pilot signal specific to area B shall be used.

By way of example and not limitation, an area may be covered by one TRP within a combined-cell or geographically adjacent TRPs within a combined-cell, and a UE may be determined as located in that area if it is served by any of the TRPs covering the area. The area may vary in shape and/or in size, according to which TRP(s) covers it.

It is also possible to determine which area a UE is located in according to which area the geographical position of the UE falls into. The geographical position of the UE may be acquired by requesting the GPS position from the UE directly or by measuring the strength of the uplink control signal from the UE and estimating the UE's position based on the measured signal strength indirectly.

As those skilled in the art would appreciate, the area where a UE is located may also be considered as a factor for grouping UEs. By way of example, UEs located in the same area and using the same transmission scheme and/or having the same capability and/or similar moving speeds may be grouped together.

For both the group-specific and the area-specific dedicated pilot schemes, explicit signalling is needed to inform the UE of the change of group/area.

As in the UE-specific dedicated pilot scheme, different group/area-specific dedicated pilots can be either carried on the same scrambling code or on different scrambling codes. When carried on the same scrambling code, different dedicated pilots are differentiated by channel codes. The channel codes can be either predefined or allocated dynamically. In the former case, there is no need to inform the UE of the channel codes used for the pilots, but the signalling informing the UE of the change of group/area is still required. When different group/area-specific dedicated pilots are carried on different scrambling codes, it is preferable to have pre-defined channel codes for the pilots.

Note that SFN transmission occupies much more channel codes than spatial reuse. It is preferable to allocate scrambling codes respectively for spatial reuse UEs and SFN UEs, so that the channel codes occupied by SFN transmission can be freed.

Besides, TRPs close to each other may use the same scrambling code to avoid too much inter-scrambling code interference, while TRPs far apart from each other may use different scrambling code to have more usable channel codes. In this way, a balance between channel code and power resources can be achieved.

One major advantage with the group/area-specific dedicated pilot scheme is that the code and power consumption is relatively small.

The above dedicated pilot schemes can be applied separately or in any combination. For example, UE-specific dedicated pilots can be adopted for high speed UEs and/or high data rate UEs (which account for only a small fraction of all UEs in a cell and will not consume excessive resources), while group/area specific pilots can be adopted for low speed UEs with low data rate. In this regard, UE-specific and group/area-specific pilots may be adaptively used for a UE, and the UE-specific pilot, the group/area-specific pilot and the existing CPICH may co-exist in the same combined-cell. For legacy UEs, only the existing CPICH will be used.

As known to those skilled in the art, the term "high speed" refers to a speed higher than or equal to 120 km/h. "High data rate" means that the amount of radio resources consumed by data transmission is much more than (e.g. ten times more than) the amount of radio resources consumed by control information transmission, that is, the radio resource overhead due to control information transmission is only a small fraction (e.g. low than 10%) of the total radio resource consumption.

Moreover, one common scrambling code can be adopted if the system traffic load is low (i.e., if the system is not code limited yet), while multiple different scrambling codes can be adopted if the system becomes code limited. The code limited scenario may happen, if, for example, there are many active LPNs and many spatial reuse and SFN UEs in one combined cell.

Preferably, when the ratio of legacy UEs that do not support the dedicated pilots is very high, dedicated pilots may be turned off. The ratio of legacy UEs can be calculated per TRP.

Figure 4:
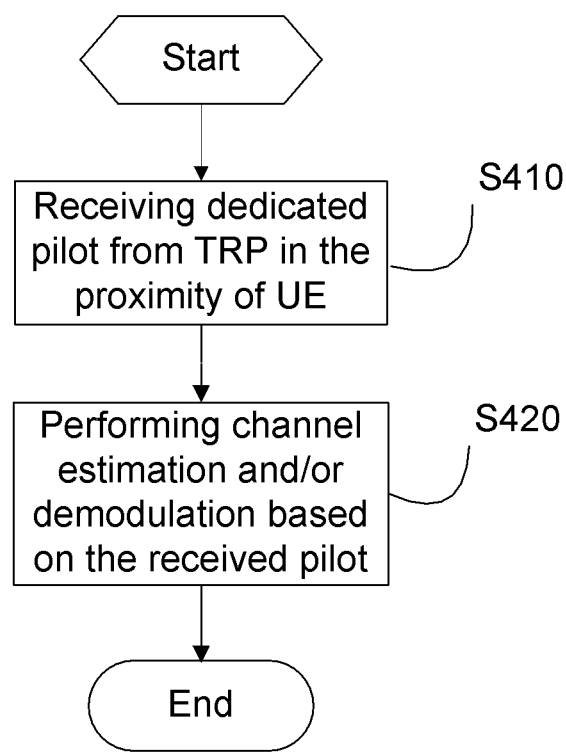
FIG. 4 is a flowchart schematically illustrating a pilot-signal-based reception method according to an embodiment of the present disclosure.

FIG. 4 schematically illustrates a pilot-signal-based reception method according to the present disclosure. This method corresponds to the above-described pilot signal configuration method and is implemented at a UE. As illustrated, after a start of the proposed method, a dedicated pilot signal is received by the UE from at least one TRP in the proximity of the UE (S410). Then, channel estimation and/or demodulation are performed based on the received dedicated pilot signal (S420). After that, the proposed method ends.

In the following, the functional module architectures of a wireless network node 500 and a UE 600 according to the present disclosure will be given with reference to FIGS. 5 and 6, respectively.

Figure 5:
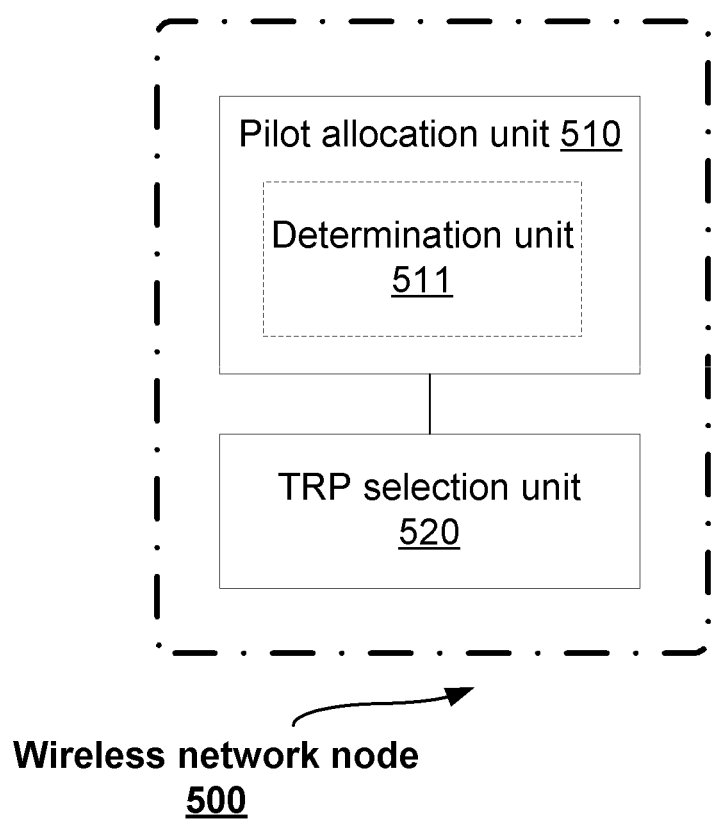
FIG. 5 is a block diagram schematically illustrating an example of a structure of a wireless network node according to the present disclosure.

As shown in FIG. 5, the wireless network node 500 comprises a pilot allocation unit 510 and a TRP selection unit 520. The pilot allocation unit 510 is configured to allocate a dedicated pilot signal to a UE within a combined cell. The TRP selection unit 520 is configured to select, from all TRPs within the combined cell, at least one TRP in the proximity of the UE for transmission of the dedicated pilot signal to the UE.

In one implementation, the dedicated pilot signal allocated by the pilot allocation unit 510 may be exclusively used by the UE.

In another implementation, the pilot allocation unit 510 may comprise a determination unit 511. The determination unit 511 may be configured to determine a UE group to which the UE belongs. A pilot signal shared by UEs in the UE group is allocated by the pilot allocation unit 510 to the UE as the dedicated pilot signal.

In a further implementation, the determination unit 511 may be configured to determine an area in which the UE is located, the area being served by one or more TRPs. A pilot signal shared by UEs located in the area is allocated by the pilot allocation unit 510 to the UE as the dedicated pilot signal.

As those skilled in the art will appreciate, the pilot allocation unit 510 and the TRP selection unit 520 may be implemented separately as suitable dedicated circuits. Nevertheless, the above-described units can also be implemented using any number of dedicated circuits through functional combination or separation. In some embodiments, the above-described units may be even combined in a single application specific integrated circuit (ASIC).

As an alternative software-based implementation, there may be provided a wireless network node comprising a memory and a processor (including but not limited to a microprocessor, a microcontroller or a Digital Signal Processor (DSP), etc.) The memory stores machine-readable program code executable by the processor to control the wireless network node to perform the method as described above with reference to FIG. 3. As a non-limiting example, the processor may be operable to perform the functions of the pilot allocation unit 510, the determination unit 511 and the TRP selection unit 520 mentioned above.

Figure 6:
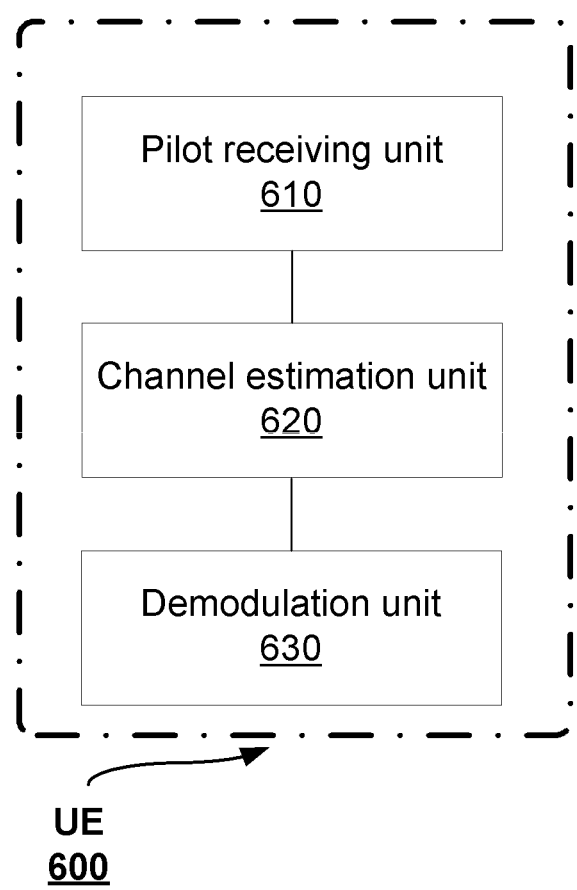
FIG. 6 is a block diagram schematically illustrating an example of a structure of a UE according to the present disclosure.

As shown in FIG. 6, the UE 600 according to the present disclosure comprises a pilot receiving unit 610, a channel estimation unit 620 and a demodulation unit 630. The pilot receiving 610 is configured to receive dedicated pilot signal from at least one TRP in the proximity of a UE. The channel estimation unit 620 is configured to perform channel estimation based on the received dedicated pilot signal. The demodulation unit 630 is configured to perform demodulation based on the received dedicated pilot signal.

Likewise, as those skilled in the art will appreciate, the pilot receiving unit 610, the channel estimation unit 620 and the demodulation unit 630 may be implemented separately as suitable dedicated circuits. Nevertheless, the above-described units can also be implemented using any number of dedicated circuits through functional combination or separation. In some embodiments, the above-described units may be even combined in a single application specific integrated circuit (ASIC).

As an alternative software-based implementation, there may be provided a UE comprising a memory and a processor (including but not limited to a microprocessor, a microcontroller or a Digital Signal Processor (DSP), etc.) The memory stores machine-readable program code executable by the processor to control the UE to perform the method as described above with respect to FIG. 4. As a non-limiting example, the processor may be operable to perform the functions of the pilot receiving unit 610, the channel estimation unit 620 and the demodulation unit 630 mentioned above.

Further, the present disclosure concerns a computer readable medium storing therein a program for a wireless network node or a UE. The program causes the wireless network node or the UE to perform the pilot signal configuration method or the pilot-signal-based reception method described above. The computer readable medium may be of any type including but not limited to a hard disk drive, a Compact Disc (CD), a Digital Video Disk (DVD), a digital tape, memory, etc.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

REFERENCE

[1] RP-121436 Study on UMTS Heterogeneous Networks

What is claimed is:

1. A pilot signal configuration method performed by a wireless network node in a wireless communication system, comprising:
   allocating a dedicated pilot signal to a User Equipment (UE) within a combined cell, wherein the dedicated pilot signal is a dedicated pilot signal exclusively used by the UE or a dedicated pilot signal shared by multiple UEs, based on moving speed and/or data rate of the UE; and
   selecting, from all Transmit-Receive Points (TRPs) within the combined cell, at least one TRP in the proximity of the UE for transmission of the dedicated pilot signal to the UE.

2. The method according to claim 1, wherein the allocating step, if the UE has a low moving speed and/or a low data rate, comprises:
   determining a UE group to which the UE belongs; and
   allocating a pilot signal shared by UEs in the UE group to the UE as the dedicated pilot signal shared by multiple UEs.

3. The method according to claim 1, wherein the allocating step, if the UE has a low moving speed and/or a low data rate, comprises:

determining an area in which the UE is located, the area being served by one or more TRPs; and allocating a pilot signal shared by UEs located in the area to the UE as the dedicated pilot signal shared by multiple UEs.

4. The method according to claim 1, wherein a pilot signal is allocated to the UE as the dedicated pilot signal exclusively used by the UE, if the UE has a high speed and/or a high data rate.

5. The method according to claim 1, wherein the wireless network node is a Node B or a Radio Network Controller (RNC) in a Universal Mobile Telecommunications System (UMTS).

6. A non-transitory computer readable medium storing therein a program for a wireless network node, the program causing the wireless network node to perform a method according to claim 1.

7. A wireless network node, comprising:
a pilot allocation unit configured to allocate a dedicated pilot signal to a User Equipment (UE) within a combined cell, wherein the dedicated pilot signal is a dedicated pilot signal exclusively used by the UE or a dedicated pilot signal shared by multiple UEs, based on moving speed and/or data rate of the UE; and
a Transmit Receive Point (TRP) selection unit configured to select, from all TRPs within the combined cell, at least one TRP in the proximity of the UE for transmission of the dedicated pilot signal to the UE.

8. The wireless network node according to claim 7, wherein:
the pilot allocation unit comprises a determination unit configured to determine a UE group to which the UE belongs, and
the pilot allocation unit is configured to, if the UE has a low speed and/or a low data rate, allocate a pilot signal shared by UEs in the UE group to the UE as the dedicated pilot signal shared by multiple UEs.

9. The wireless network node according to claim 7, wherein:
the pilot allocation unit comprises a determination unit configured to determine an area in which the UE is located, the area being served by one or more TRPs, and
the pilot allocation unit is configured to, if the UE has a low speed and/or a low data rate, allocate a pilot signal shared by UEs located in the area to the UE as the dedicated pilot signal shared by multiple UEs.

10. The wireless network node according to claim 7, wherein the wireless network node is a Node B or a Radio Network Controller (RNC) in a Universal Mobile Telecommunications System (UMTS).

11. The wireless network node according to claim 7, wherein the pilot allocation unit is configured to allocate a pilot signal to the UE as the dedicated pilot signal exclusively used by the UE, if the UE has a high speed and/or a high data rate.

12. A pilot-signal-based reception method performed by a User Equipment (UE) in a wireless communication system, comprising:
receiving a dedicated pilot signal from at least one Transmit-Receive Point (TRP) in the proximity of the UE, wherein the dedicated pilot signal is a dedicated pilot signal exclusively used by the UE or a dedicated pilot signal shared by multiple UEs, based on moving speed and/or data rate of the UE; and
performing channel estimation and/or demodulation based on the received dedicated pilot signal.

13. The method according to claim 12, wherein the UE belongs to a UE group, and the dedicated pilot signal is the dedicated pilot signal shared by multiple UEs in the UE group, if the UE has a low speed and/or a low data rate.

14. The method according to claim 12, wherein the UE is located in an area being served by one or more TRPs, and the dedicated pilot signal is the dedicated pilot signal shared by multiple UEs located in the area, if the UE has a low speed and/or a low data rate.

15. A non-transitory computer readable medium storing therein a program for a UE, the program causing the UE to perform a method according to claim 12.

16. The method according to claim 12, wherein the dedicated pilot signal is the dedicated pilot signal exclusively used by the UE, if the UE has a high speed and/or a high data rate.

17. A User Equipment (UE) comprising:
a pilot receiving unit configured to receive a dedicated pilot signal from at least one Transmit Receive Point (TRP) in the proximity of the UE, wherein the dedicated pilot signal is a dedicated pilot signal exclusively used by the UE or a dedicated pilot signal shared by multiple UEs, based on moving speed and/or data rate of the UE;
a channel estimation unit configured to perform channel estimation based on the received dedicated pilot signal; and
a demodulation unit configured to perform demodulation based on the received dedicated pilot signal.

18. The UE according to claim 17, wherein:
the dedicated pilot signal is the dedicated pilot signal shared by multiple UEs, if the UE has a low speed and/or a low data rate; and
the dedicated pilot signal is the dedicated pilot signal exclusively used by the UE, if the UE has a high speed and/or a high data rate.

* * * * *